United States Patent [19]

Schultz et al.

[11] 4,362,785

[45] Dec. 7, 1982

[54] POLYMERS CONTAINING 2,5-OXOLANYLENE SEGMENTS

[75] Inventors: William J. Schultz, White Bear Lake, Minn.; Alan R. Katritzky, Norwich, England

[73] Assignee: Minnesota Mining and Manufacturing Co., St. Paul, Minn.

[21] Appl. No.: 284,229

[22] Filed: Jul. 17, 1981

Related U.S. Application Data

[60] Division of Ser. No. 803,207, Jun. 3, 1977, Pat. No. 4,309,516, which is a continuation-in-part of Ser. No. 740,661, Nov. 10, 1966, abandoned, which is a continuation-in-part of Ser. No. 692,602, Jun. 2, 1976, abandoned.

[51] Int. Cl.$^3$ .................... B32B 27/06; B32B 27/36
[52] U.S. Cl. .................................... 428/480; 428/411; 428/483; 428/517; 428/521; 428/523

[58] Field of Search ............. 428/480, 483, 411, 521, 428/517, 523

[56] References Cited

U.S. PATENT DOCUMENTS

| | | | |
|---|---|---|---|
| 2,660,563 | 8/1953 | Banes et al. | 260/96 R X |
| 2,927,100 | 3/1960 | Cantevino et al. | 526/49 |
| 3,336,253 | 8/1967 | Wong et al. | 260/29.2 EP |
| 3,661,874 | 5/1972 | Olson | 526/49 |

*Primary Examiner*—William F. Hamrock
*Attorney, Agent, or Firm*—Cruzan Alexander; Donald M. Sell; James V. Lilly

[57] ABSTRACT

Polymers containing recurring 2,5-oxolanylene units wherein at least 60 percent of the units are joined directly to one another so as to provide segments consisting of at least 6 of said units.

2 Claims, No Drawings

POLYMERS CONTAINING 2,5-OXOLANYLENE SEGMENTS

CROSS-REFERENCE TO RELATED APPLICATIONS

This is a division of application Ser. No. 803,207, filed June 3, 1977, now U.S. Pat. No. 4,309,516, which was a continuation-in-part of Ser. No. 740,661, filed Nov. 10, 1966, now abandoned, which was a continuation-in-part of Ser. No. 692,602, filed June 2, 1976, now abandoned.

This invention relates to polymers containing 2,5-oxolanylene segments. More particularly it relates to polymers containing recurring 2,5-oxolanylene (or oxolane) units of the formula:

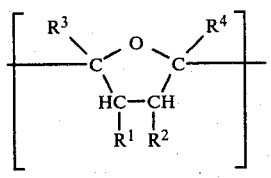

I wherein at least 60% of said units are joined directly to one another so as to provide segments containing at least six of said units and wherein $R^1$, $R^2$, $R^3$ and $R^4$ are individually hydrogen or alkyl groups containing up to 8 carbon atoms each. The invention also relates to methods of preparing the polymers and to articles which employ them.

The polymers of the present invention are highly active in altering the surface properties of substrates, for example, relative to adhesion and hydrophobicity, and are capable of forming compatible (i.e. homogeneous) blends with high and low molecular weight thermoplastic and thermosetting resins and polymers. Additionally the polymers of this invention can be used to prepare graft copolymers having desirable physical characteristics.

Thus, substrates coated with polymers of the invention exhibit improved adhesion to various surfaces. For example, pressure-sensitive adhesives exhibit improved adhesion to polyester and polyolefin films coated with poly-2,5-oxolane-containing polymers.

Additionally, normally hydrophobic surfaces can be rendered hydrophilic when coated with polymers of the invention. This is of particular use when the polymers are employed on polyester films (e.g. polyethylene terephthalate, copolymers of terephthalic acid and isophthalic acid with ethylene glycol etc.) and polyolefin films (e.g., polypropylene films). Such films are not readily receptive to water-based inks and dyes unless first subjected to relatively complicated treatments (e.g., using corona discharge techniques, etc.). It has now been found that the same result can be obtained by simply treating such normally hydrophobic films with the polymers of the invention.

The ability of the polymers to form compatible blends with a number of other polymers and resins is both unusual and valuable. While certain polymers are known to be compatible with other polymers and resins, this characteristic is very unusual. Thus the opportunity for blending polymers to obtain mixtures having desired properties is normally very limited.

The broad compatibility of the poly-2,5-oxolanylene polymers of the present invention is of great value. Homogeneous blends of the polymers with other polymers result in products having properties different from either component alone, e.g. such blends have a single glass transition temperature. Thus a thermoplastic polymer with which the polymers of the invention form a homogeneous blend (such as polyvinyl chloride, chlorinated polyvinyl chloride and polymethylmethacrylate) can be permanently plasticized by the addition of an amount of a polymer of the invention. Additionally, the brittleness and/or lack of adhesion to substrates frequently encountered with thermosetting resins (such as epoxy resins) can often be overcome by blending an amount of a polymer of the present invention therein prior to curing. The polymers of the invention are compatible with such other polymers in all proportions. Normally, however, the compatible blends contain from about 1 to 90 weight percent of the polymers of the invention and from 99 to 10 weight percent of the said other polymers.

The polymers of the present invention may be homopoly-2,5-oxolanylenes or they may be copolymers containing segments of 2,5-oxolanylene units together with substantial amounts of other units. Preferably the polymers have molecular weights ranging from about 420 to 1,500,000 (ordinarily corresponding to a degree of polymerization of about 6–20,000 with respect to all recurring units). Preferably also the polymers contain at least about 10 percent by weight of units of type I. The copolymers may be block or graft copolymers, and the segments of units I preferably appear therein in the main polymer backbones. Both the homopolymers and the copolymers normally contain small amounts of defect structures due to the nature of the process for their preparation. In the homopolymers, units containing such defect structures are limited to less than about 15 percent of the weight of the polymer, an amount insufficient to have any substantial effect on the properties of the homopolymer. As will be explained hereinafter, such defect structures include the addition products of fragments of nucleophiles or electrophiles used as ring expansion initiators, solvent fragments, etc.

Other structures which can be present in the polymers of the invention include units resulting from the incomplete reaction or non-reaction of units of the poly-1,4-dienes from which the present polymers are prepared (as will be explained hereinafter), i.e. units of the types:

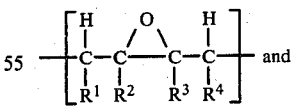 and

II

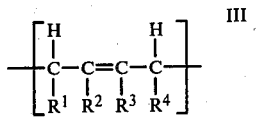

III wherein $R^1$, $R^2$, $R^3$ and $R^4$ are as previously defined.

The polymers of the invention are prepared in two steps from a polymer precursor which contains one or more A segments having a perfectly recurring structure of type III units:

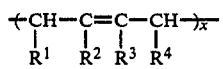

Segment A where x is the number of times that each unit III recurs in segment A. Thus, a single A segment continues so long as the sequence of recurring main chain olefin groups, each separated from the next by two main chain carbon atoms, continues. The termini of each segment A are either one or both polymer chain ends or any anomalous (different) group which intervenes between these segments. Such anomalous groups would, for example, include 1,2- or 3,4-diene addition products:

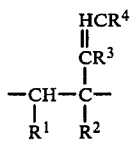

incorporated comonomer units, e.g. a single styrene unit or a recurring segment or block of styrene units. It is important that these intervening or anomalous groups be of such a character that they do not interfere with the subsequent epoxidation reaction, which is discussed below.

In any polymer used as a precursor in the present process, the type III units must amount to not less than 80 percent of all diene units therein (i.e. a minor amount, not more than 20 percent may be diene units containing unsaturation in the side chains, such as 1,2-and 3,4-butadiene units). Also at least about 50 percent of all type III units in the precursor polymer must be present in A segments which contain at least 10 units. The precursor polymers may range in degree of polymerization from about 6 to 20,000 with respect to units of type III. The range of from about 100 to 4,000 is most preferred, however, since the polymers of the invention prepared from them generally have the best balance of physical properties (e.g., acceptable tensile strength combined with acceptable handling characteristics).

Suitable precursor polymers can be provided in various ways. For example, natural rubber and gutta percha constitute such precursor polymers in which essentially the entire high molecular weight polymer is constituted of one such segment (1,4-poly-cis-isoprene and 1,4-poly-trans-isoprene, respectively). They may also be provided using synthetic routes well known to those skilled in the art. Thus, 1,3-diene monomers may be anionically polymerized (e.g., using butyl lithium as initiator in a nonpolar solvent such as cyclohexane) to provide a suitable precursor polymer in which 1,4-addition predominates over 1,2-addition to yield segments having the requisite structure described above, which recur within the polymer backbone. In this case, however, 1,2-addition usually occurs to the extent of 5–20 percent to give rise to anomalous intervening groups separating the recurring A segments. Ziegler polymerization of 1,3-dienes, in which one or more transition metal compounds is used as initiator, is a highly preferred method of providing precursor polymers because the great predominance of 1,4-addition gives polymers typically containing 95–99 weight percent of A segments. Another way of providing suitable precursor polymers containing a large proportion of A segments is by the use of specified transition metal initiators to polymerize cyclobutene, as described by G. Natta et al, Makromol. Chem. 91, pps. 87–106 (1966).

When the polymers are prepared from copoly-1,4-dienes, the units resulting from the other comonomers thereof will be present. Such units do not enter into the reaction by which the 2,5-oxolanylene units (I) are formed and ordinarily come into the copolymers of the present invention from the precursors unchanged. Such units include for example the type:

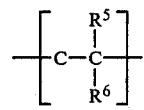

IV wherein $R^5$ is hydrogen or methyl and $R^6$ is phenyl, cyano or $-COOCH^3$. These would be present as a result of the inclusion of the anionically polymerizable olefins as styrene, α-methylstyrene, acrylonitrile, methacrylonitrile, methylacrylate and/or methylmethacrylate as comonomers in the precursor dienes.

Suitable precursor graft and block polymers can be prepared by techniques known to the art. For example, the graft polymers can be prepared by the free radical polymerization of ethylenically unsaturated monomers such as methylmethacrylate, methylacrylate or styrene with the appropriate polymeric precursor with subsequent conversion of the olefin group to the oxolanylene structure. Block polymers suitable for use as precursor polymers of the invention may be prepared by, for example, the techniques described in D. C. Allport and W. H. Janes, "Block Copolymers", Chapters 3 and 4, Halstead Press, 1973, and in M. Szwarc, "Carbanions, Living Polymers and Electron Transfer Process", Interscience Publishers, 1968. Representative commercially available block copolymers suitable for use in preparing polymers of the invention include polystyrene-polybutadiene-polystyrene block copolymers, polystyrene-polyisoprene-polystyrene block copolymers.

It will be appreciated by those skilled in the art that A segments, when they recur within the polymer molecule, will normally be present in a relatively wide distribution of lengths. However, knowledge of the number of III units relative to the number and type of anomalous groups or segments which separate A segments makes it possible to calculate the median A segment length x (using standard probability theory). The term, median segment length, as used herein connotes that largest value of x, i.e. the segment length, wherein half of all the mass of the units of a particular type recurring in the polymer (especially type I units) occur in segment lengths equal to or greater than x.

The epoxidation of the polymer precursor is normally performed so as to convert substantially all main chain olefin groups into oxirane groups. When such conversion is quantitative, all III units are converted to II type units to form B segments having a perfectly recurring structure of such units:

$$\left[ \begin{array}{c} \phantom{X} \\ -CH-C \overset{O}{\diagup\diagdown} C-CH- \\ | \phantom{X} | \phantom{XX} | \phantom{X} | \\ R^1 \phantom{X} R^2 \phantom{XX} R^3 \phantom{X} R^4 \end{array} \right]_x$$

Segment B which have the same median segment length x as the A segments of the precursor polymer. To the extent that epoxidation falls short of converting 100 percent of the III units, commensurate reduction in the median B segment length occurs. In any event, it is critical that the epoxidized polymeric intermediates used to prepare the polymers of this invention also have the median B segment length x of at least 10.

The epoxidization is generally carried out by the reaction of the precursor with a peracid (e.g., peracetic acid). Typically, the reaction is carried out at about 30° C. or less and at atmospheric pressure using stoichiometric amounts of the reactants. After the reaction has been completed, the polymer is recovered from the reaction mixture by, for example, precipitation, and the precipitate is purified and dried.

In the ring expansion step of the process, an appreciable fraction of the oxirane groups in the B segments of the epoxidized polymer is converted to type I units. It is a particularly significant aspect of the invention that polymers containing B segments having the requisite structural features discussed previously can be made to undergo an intramolecular (more specifically—an intrasegmental) chain reaction in which a large fraction of the oxirane groups within the B segments are converted to ring-expanded, recurring 2,5-oxolanylene units. The hypothesized course of the reaction is as follows (shown separately for nucleophilic and electrophilic initiation).

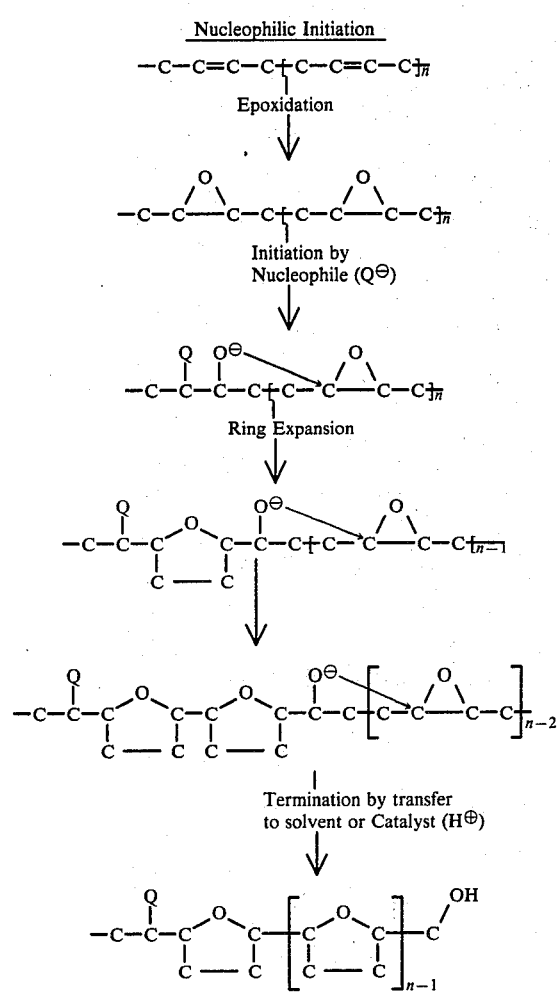

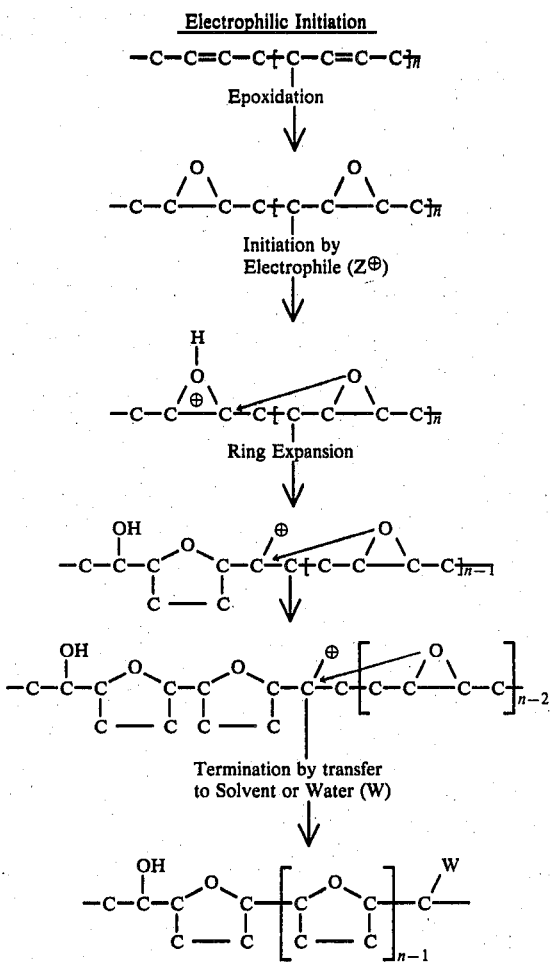

Thus it appears that the initiation step proceeds via the cleavage of a randomly situated oxirane ring located within a B segment to generate a reactive ionic intermediate. The latter then reacts with an adjacent oxirane ring to start an intramolecular chain propagation reaction in which an uninterrupted sequence of adjacent oxirane groups is rapidly converted to an uninterrupted sequence of 2,5-oxolanylene groups joined one to the other. This chain propagation (or ring expansion) reaction proceeds within a single B segment of the polymer molecule until a terminus group of that segment is encountered and chain termination occurs. It is believed that this termination generally entails a chain transfer reaction with either an initiator or a solvent molecule to append a new terminal group, e.g. a hydroxyl or methoxyl group, and generate a new initiating ion, e.g. a proton in the case of an electrophilically initiated ring expansion reaction, or a hydroxide or methoxide ion in the case of a nucleophilically initiated ring expansion reaction. The thus generated ion is then free to initiate a similar ring expansion reaction on another oxirane segment situated either on the same polymer backbone or on the polymer backbone of a different molecule.

It follows that:

(1) The requisite structural features set forth for polymers containing B segments must be met in order to support the formation of 2,5-oxolanylene units in the necessary numbers and arrays (i.e. segments containing consecutive oxolanylene groups).

(2) The longer a particular B segment, the more likely it is to undergo the ring expansion reaction. Even at relatively low oxirane conversions (e.g., 20 percent), relatively long segments of recurring 2,5-oxolanylene groups are produced.

(3) The median segment length of recurring 2,5-oxolanylene groups is a function both of the weight median length of the B segment from which they were derived and the overall degree of conversion of oxirane groups at the point at which the ring expansion reaction is terminated.

(4) The median length of the segments produced toward the end of the ring expansion reaction is smaller than that of the segments produced near the beginning thereof.

(5) Polymers in which the epoxidized B segments constitute at least 97 percent of the weight of the total polymer chain (derivable from natural rubber, gutta percha and polymeric dienes made with Zeigler-type initiators) can be made to yield ring-expanded products in which 2,5-oxolanylene units recur in extremely long segments, e.g. weight average segment lengths of 100 or more.

The ring expansion reaction is carried out in the presence of an initiator selected from reagents which are known to initiate homopolymerization of oxiranes by a ring opening mechanism, but which preferably do not undergo addition reactions with the oxirane groups. Particularly useful initiators are strong nucleophiles (tertiary amines such as trialkylamines, e.g. triethylamine, and alkali metal and quaternary ammonium hydroxides, especially the preferred tetraalkylammonium hydroxides, e.g. tetrabutyl ammonium hydroxide) and strong electrophiles (Brønsted and Lewis acids such as phosphoric acid, hydrochloric acid, $SbF_5$, $AsF_5$ and $BF_3$ and other electrophiles including bis(trifluoromethylsulfonyl)bromomethane, the diethyl ether complexes of Lewis acids such as boron trifluoride diethyletherate, and organometallic initiators such as $Al(C_2H_5)_3 \cdot H_2O$. A minor amount of initiator (e.g., from about 0.1 to 10 mole percent, based on the amount of oxirane present) is used.

Normally the ring expansion is carried out in a polar solvent such as 1,4-dioxane or a mixture of dioxane and methanol at from about −50° to 150° C. and takes from about one to 16 hours. The severity of the conditions (i.e. time and temperature) are directly relatable to the activity of the initiator. It is known that electrophilic initiators are generally more reactive with these types of oxiranes and thus milder reaction conditions (e.g. 1 to 8 hours at −50° to +30° C.) can be employed when an initiator such as $SbF_5$ is used. Nucleophilic initiators generally require more stringent conditions, e.g. 2 to 16 hours at 50° to 150° C. The reaction may be terminated at any time prior to complete conversion of the oxirane units to oxolanylene units. Alternatively, the ring expansion can be carried out in the solid state by adding the initiator to the epoxidized precursor, coating the combination onto a substrate, drying and heating at, for example, 100° C.

The resultant polymer is then recovered by precipitation from water and may be further purified by redissolving and reprecipitating.

As prepared, the polymers of the invention are water-insoluble (i.e. are less than about 2 percent soluble in water at 25° C.) and cannot be spontaneously dispersed in water. However, such polymers may be made water-dispersible and/or water-soluble by means of post-reactions (reactions by which certain structures are appended to already formed polymers of the invention). Such structures are conveniently added by the ionic opening of oxirane rings remaining in the polymer (in units of type II above) by reaction with either an electrophilic or a nucleophilic ring opening reagent to form units of the formula:

$$\begin{array}{cccc} H & OH & Y & H \\ | & | & | & | \\ -C-&C-&C-&C- \\ | & | & | & | \\ R^1 & R^2 & R^3 & R^4 \end{array} \qquad V$$

where Y is the radical corresponding to the ring opening reagent having the structure Y-M wherein M is hydrogen or an alkali metal. Common Y radicals are, for example, hydroxyl, amino, sulfo, alkoxy, aroxy, thiol, carboxylate ester and alkylthia wherein the individual aliphatic groups (e.g., in the amino, alkoxy, carboxylate ester and alkylthia groups) contain not more than 8 carbon atoms and the individual aryl groups (in the aroxy) contain not more than 6 carbon atoms.

The following are some of the preferred subclasses of the polymers of the invention:

Those polymers consisting essentially of from about 10 to 100 percent of units of type I, from about 0 to 90 percent of units of type II and from about 0 to 10 percent of units of type III.

Those polymers which consist essentially of from about 20 to 100 mole percent of segments or blocks of units of type I and from about 0 to 80 mole percent of segments of units of type II.

Homopolymers in which $R^1$, $R^2$, $R^3$ and $R^4$ are each hydrogen or in which $R^1$, $R^2$ and $R^4$ are hydrogen and $R^3$ is an alkyl radical, most preferably methyl.

Preferably the number average molecular weight of the polymers of the invention is at least about 420 and not more than about 200,000. Normally and preferably also, the polymers of the invention are substantially completely soluble in chloroform at 20° C. and to the extent of at least 10 parts by weight of polymer in 90 parts by weight of chloroform.

The structure of the oxolanylene-containing polymers of the invention can be demonstrated by proton nuclear magnetic resonance (NMR). For example, the analysis of a 2,5-oxolanylene polymer derived from cis-1,4-polybutadiene was run in deuterochloroform as the solvent and all chemical shifts (i.e. absorption peaks) were reported in parts per million (ppm) from tetramethylsilane. The peak assignments were as follows:

A. The epoxide precursor:

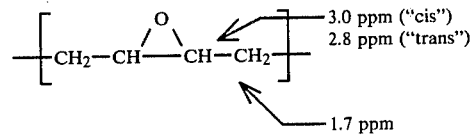

B. The oxolanylene product:

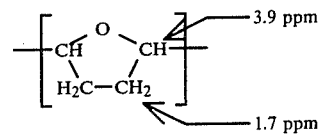

C. Typical "other" functional groups:

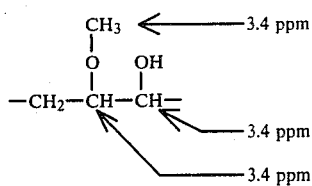

The "other" functional groups in C are typically initiation and termination sites of a sequence of 2,5-oxolanylene units. They may result from transfer to the catalyst, or reaction solvent, etc. The assignments set forth in C are for groups which result when an epoxidized polybutadiene is ring expanded in the presence of tetramethyl ammonium methoxide in a solvent blend of methanol and dioxane (90 percent).

Transition temperature measurements (particularly the $T_m$, the crystalline melting temperature) at various stages of conversion of the epoxidized polymers to the polymers of the invention demonstrate that segmented copolymers having sequences of I and II type units are being formed. These segmented copolymers provide a useful method of varying the physical properties of the polymers of the invention (since it is possible to stop the conversion from the tough, strong, epoxidized polymer to the elastomeric, compatible oxolanylene polymer at any point). The formation of segmented polymers also verifies the chain reaction mechanism proposed for the formation of the oxolanylene segments. Thus, a polymer consisting of type II units derived from poly-1,4-butadiene has a crystalline melting point at 80° C. This crystalline transition is present after 70 percent of the II units have been converted to I units. It is well known that a crystalline transition in a polymer is only present when the polymer units are present in an uninterrupted and regular sequence. Therefore the remaining 30 percent of type II units must be present in sequences. This then dictates that the type I units formed are also in sequences.

The following examples further illustrate the present invention.

EXAMPLE 1

A polymer of the invention prepared from cis-1,4-polyisoprene.

The following two solutions were prepared:

| Solution A | |
|---|---|
| cis-1,4-polyisoprene (number average molecular weight, $M_n$ = 100,000) | 100 grams |
| dichloromethane | 2000 ml. |
| Solution B | |
| peracetic acid solution* | 353 grams |
| sodium acetate (buffering agent) | 24 grams |

*40% peracetic acid, 40% acetic acid, 13% water, 5% hydrogen peroxide and 2% sulfuric acid Solution B was slowly added to solution A from a dropping funnel over a two hour period, the temperature of the mixture being maintained below 5° C. The mixture was then reacted for an additional 30 minutes while maintaining a temperature less than 5° C. The resulting epoxidized polymer was precipitated in methyl alcohol and washed four times with copious quantities of methyl alcohol. The polymer was 98 percent epoxidized.

The following ingredients were charged to a reaction vessel in a nitrogen atmosphere:

| epoxidized polyisoprene (from above) | 2 grams |
|---|---|
| dimethyl sulfoxide (reaction solvent) | 40 grams |
| orthophosphoric acid (catalyst or initiator) | 0.12 gram |

The reaction mixture was maintained under nitrogen for 16 hours at 100° C. with agitation. The resultant 2,5-oxolanylene polymer of the invention was then precipitated and washed with water.

In a similar run 2 grams of epoxidized polyisoprene, 40 grams of 90/10 dioxane/water solvent and 0.2 gram of $(CF_3SO_2)_2CHBr$ catalyst or initiator were reacted under the same conditions. Analysis of the polymer indicated that about 75 mole percent of the oxirane groups had been converted to 2,5-oxolanylene units and that at least 60 percent of these units were joined one to the other in segments consisting of at least 6 of said units.

EXAMPLE 2

A polymer of the invention prepared from cis-1,4-polybutadiene.

The following two solutions were prepared:

| Solution A | |
|---|---|
| cis-1,4-polybutadiene ($M_n$ = 98,000; analysis 98% main chain olefin units of type III, 2% vinyl units resulting from 1,2-butadiene addition) | 150 grams |
| methylene chloride | 3000 ml. |
| Solution B | |
| peracetic acid solution (as described in Example 1) | 530 grams |
| sodium acetate (buffering agent) | 36.8 grams |

Solution B was slowly added to solution A from a dropping funnel over a 40 minute period, the temperature of the mixture being maintained below 30° C. The mixture was then reacted for an additional 3–12 hours while maintaining a temperature of less than 25° C. The resulting epoxidized polymer was precipitated in methyl alcohol, redissolved in p-dioxane and reprecipitated in distilled water.

The polymer was 98 percent epoxidized.

The following ingredients were utilized in converting the epoxidized polymer to a polymer of the invention:

| polybutadiene (98% epoxidized) | 20 grams |
|---|---|
| dioxane (reaction solvent) | 340 grams |
| distilled water | 40 grams |
| $(CF_3SO_2)_2CHBr$ (catalyst-50% solution by weight in dioxane) | 2 grams |

The catalyst was slowly added to the other ingredients with vigorous agitation and the mixture was agitated and reacted at 25° C. for six hours. The catalyst was neutralized with tetraethylammonium hydroxide, and the 2,5-oxolanylene polymer was recovered by precipitating and washing the polymer with distilled water.

Analysis of the polymer indicated that about 85 mole percent of the oxirane groups had been converted to 2,5-oxolanylene units and that at least 60 percent of these units were joined one to the other in segments consisting of at least 6 of said units.

EXAMPLE 3

A polymer of the invention consisting essentially of units of types I and II.

Epoxidized cis-1,4-polybutadiene was prepared as described in Example 2. A solution of 30 grams of the polybutadiene in 730 grams of dioxane was warmed to 75° C., and 111 grams of a 10 percent by weight solution of tetrabutylammonium hydroxide in methanol was added. The mixture was reacted in an inert atmosphere at 75° C. Individual samples were removed from the reaction mixture after one, 4 and 8 hours. These samples were precipitated into one liter of water and soaked for 16 hours. The samples were then dried in a dessicator over $P_2O_5$ at 1 Torr for 72 hours.

The samples were analyzed to determine the relative concentration of the oxolanylene and oxirane units in the polymer. The results were as follows:

| Sample Time | Mole % Polyoxirane | Mole % Polyoxolane | Mole % Other* |
|---|---|---|---|
| 1 hour | 68 | 30 | 2 |
| 4 hours | 24 | 73 | 2 |
| 8 hours | 12 | 85 | 2 |

*primarily vinyl

The samples and the epoxidized polybutadiene starting material (sample time=0 hr.) were also analyzed by differential thermal analysis to determine the transition temperatures of the polymers. The results were as follows:

| Sample Time | Mole % Polyoxirane | Mole % Polyoxolane | Mole % Other | $T_g$(°C.) | $T_m$(°C.) |
|---|---|---|---|---|---|
| 0 hour | 98 | 0 | 2 | −12 | 80 |
| 1 hour | 68 | 30 | 2 | −3 | 76 |
| 4 hours | 24 | 73 | 3 | 19 | 77 |
| 8 hours | 12 | 85 | 3 | 25 | none |

The foregoing shows that as the conversion of oxirane units to 2,5-oxolanylene units increases, the glass transition temperature ($T_g$) of the product increases. These data further show that as the number of oxirane units becomes small, the polymer ceases to exhibit a melting point ($T_m$). This is consistent with the conversion of the oxirane groups to 2,5-oxolanylene groups in the chain reaction as previously explained.

EXAMPLE 4

Polymers of the invention prepared from epoxidized intermediate polymers in which the length of the B segments varies.

Two different polybutadienes were employed as precursors. The first diene (BD1) had an $M_n$ of 11,000 and comprised 9 mole percent vinyl units, 38 mole percent cis-1,4-butadiene units and 53 mole percent trans-1,4-butadiene units. The second (BD2) had an $M_n$ of 98,000 and comprises 98 mole percent cis-1,4-butadiene units and 2 mole percent 1,2-vinyl units.

The precursor polymers were epoxidized with varying stiochiometric concentrations of peracetic acid to achieve varying degrees of epoxidation, thereby providing intermediate polymers in which the median length of the B segments varied widely. Epoxidation was carried out in methylene chloride over a period of about 6 hours using conditions similar to those described in Example 2. The epoxidized polymers were analyzed by NMR to determine the relative concentration of the various units in the polymer. The precursor diene polymer and peracetic acid charges used and the results obtained were as follows:

| | Charge | | Epoxidized Polymer Composition | | |
|---|---|---|---|---|---|
| Lot | Polymer (gms) | Peracetic Acid | Vinyl | Cis-1,4-diene(1) | "Cis" Oxirane(2) | "Trans" Oxirane(2) |
| I | 100 BD2 | 229 | 2 | 29 | 69 | — |
| II | 100 BD2 | 310 | 2 | 9 | 89 | — |
| III | 100 BD2 | 356 | 2 | — | 98 | — |
| IV | 150 BD1 | 540 | 9 | — | 38 | 53 |

(1)Type III units
(2)Type II units

These epoxidized polymers were reacted (as 6–8 percent solutions by weight in 90/10 dioxane/methanol) at 80° C. for varying periods of time in the presence of a catalyst. The resulting polymers were precipitated in distilled water and dried over $P_2O_5$ at 0 Torr for 24 hours. Solutions of 0.2 percent by weight of the polymers in $CHCl_3$ were prepared and concentrated to removal all volatile impurities. When the solutions had been concentrated to 10 percent solids, thin films of the solutions were cast onto tetrafluoroethylene sheets. The films were air dried for 16 hours and vacuum dried over $P_2O_5$ at 1 Torr for 24 hours then redissolved in deuterochloroform at 10 percent solids by weight and analyzed by NMR to determine the relative concentrations of the various units in the polymer. The reaction times and results were as follows:

| Lot | Epoxidized Polymer Lot | Catalyst (Moles %)(1) | Rxn. Time (hrs) | Product Polymer Composition (Mole %) | | | | |
|---|---|---|---|---|---|---|---|---|
| | | | | 1,2-diene | 1,4-diene | Oxirane | Oxolanylene | Other |
| A | I | 10 | 24 | 2 | 28 | 49 | 13 | 8 |
| B | I | 10 | 84 | 2 | 29 | 36 | 22 | 12 |
| C | II | 10 | 24 | 2 | 9 | 20 | 56 | 14 |
| D | II | 10 | 84 | 2 | 8 | 19 | 58 | 13 |
| E | II | 25 | 24 | 2 | 9 | 16 | 59 | 15 |
| F | III | 10 | 24 | 2 | — | 13 | 79 | 6 |
| G | III | 10 | 84 | 2 | — | 9 | 85 | 3 |
| H | III | 25 | 24 | 2 | — | 7 | 87 | 5 |
| I | IV | 10 | 24 | 8 | — | 28 | 54 | 9 |
| J | IV | 10 | 84 | 8 | — | 24 | 62 | 9 |

(1)The mole percentages of the catalyst, $(CH_3)_4NOCH_3$, are based on the original olefin content of the starting polydienes.

Less than 60 percent of the oxolanylene units in polymers A and B are in segments in which at least six such units are directly joined (as shown by statistical analysis). Therefore polymers A and B do not fall within the present invention. The remaining polymers (C–J) do fall within the invention, however.

These data demonstrate that the formation of 2,5-oxolanylene units requires that the oxirane groups be present in type B segments, i.e. separated by no more and no less than 2 main chain carbon atoms. Thus, polymers prepared from epoxidized polymer I (69 mole percent oxirane) greatly limit the conversion of the oxirane units to oxolanylene units.

The data further demonstrate that formation of the oxolanylene units is the major cause of the reduction in oxirane units since, aside from the formation of the oxolanylene units, there is relatively little oxirane depletion. Thus, it is clear that the ring expansion reaction wherein the oxolanylene units are formed is a chain process in which a random cleavage of an oxirane group initiates and promotes the formation of 2,5-oxolanylene units. Furthermore, the average length of the resultant oxolanylene units bears a direct relationship to the average length of the average oxirane segment.

EXAMPLE 5

A polypropylene film rendered hydrophilic by a coating of a polymer of the invention.

One part by weight of a polymer of the invention prepared as described in Example 4F was dissolved in 99 parts by weight isopropyl alcohol. An oriented 2 mil polypropylene film, having a water contact angle of 100°, was dipped into the polymer solution and dried at 100° C. for 10 minutes. The resultant coated film had a water contact angle of 30°. The coated film was soaked in water for 16 hours and still maintained a contact angle of 30°. The coated film was then soaked in methyl alcohol for 16 hours and still maintained a contact angle of 30°.

The coated film was inked with water-based ink, and the ink adhered thereto. The ink did not adhere to uncoated polypropylene film.

EXAMPLE 6

A polyester film rendered hydrophilic by a coating of a polymer of the invention.

One part by weight of a polymer prepared as described in Example 4F was dissolved in 99 parts by weight of tetrahydrofuran. Polyester film having a water contact angle of 67° was dipped into this solution. The film was then dried in a 130° C. forced air oven for five minutes. The water contact angle on the resulting coated film was reduced to 10°.

This primed film demonstrated improved adhesion to polar materials. The improved adhesion was demonstrated by application of a strip of pressure-sensitive tape to coated and uncoated polyester film. The tape adhered only weakly to the uncoated polyester film but adhered tenaciously to the coated polyester film.

EXAMPLE 7

Post-reaction of a polymer of the invention with sodium sulfite to render it water-dispersible.

A water-dispersible polymer according to the invention was prepared by dissolving ten grams of polymer F of Example 4 in a mixture of 100 grams of tetrahydrofuran and 100 grams of water at 60° C. Five grams of tetrabutyl ammonium bromide and 10 grams of sodium sulfite were added to the solution and the resulting mixture reacted for five days with agitation. The resulting polymer was water-dispersible and thereby useful for coating from aqueous systems. This water-dispersibility was achieved by the opening of residual oxirane groups in the polymer and the addition of sulfo groups to the polymer at those locations.

EXAMPLE 8

Post-reaction of a polymer of the invention with dimethylamine to render it water-dispersible.

A water-dispersible polymer according to the invention was prepared by dissolving ten grams of polymer F of Example 4 in 100 grams of methyl alcohol. Forty grams of a 40 percent by weight solution of dimethyl amine in water was added to the solution and the resulting mixture reacted for three hours. A water-dispersible polymer was obtained as a result of the opening of residual oxirane groups in the polymer and the replacement of the oxirane oxygen thereof by hydroxyl and amino groups. Nitrogen analysis showed 0.8 percent N, indicating that 30 percent of the residual oxirane groups had been converted to tertiary amino alcohol groups.

EXAMPLE 9

Graft copolymers according to the invention.

Two graft copolymers according to the invention were prepared from the following materials:

| | A | B |
|---|---|---|
| Polymer F of Example 4 | 3 grams | 3 grams |
| Methlmethacrylate | 3 grams | — |
| Dodecylmethacrylate | — | 3 grams |
| Toluene | 18 grams | 18 grams |
| t-Butyl hydroperoxide | 0.06 gram | 0.06 gram |

The solutions were placed in a sealed vessel in an oxygen-free atmosphere and reacted for 40 hours at 70° C. The resulting polymers provided clear solutions and, when cast, clear films.

Sample B was analyzed in detail. A film was dried at 1 Torr, redissolved in deuterochloroform and analyzed by proton MNR. The resulting film comprised 46 mole percent polydodecylmethacrylate segments and 54 mole percent of polymer 4F segments. The solubility characteristics of the polymer demonstrated that it was a graft polymer. Thus the polymer was not soluble, although highly swollen, in methanol. Methanol is a solvent for poly-2,5-oxolanylene but is not a solvent for polydodecylmethacrylate. Moreover, less than 10 weight percent of the polymer could be extracted with methanol. Additionally, the polymer was not soluble in hexane. Hexane is a solvent for polydodecylmethacrylate but is not a solvent for poly-2,5-oxolanylene. Again, less than 10 weight percent of the polymer could be extracted with hexane. Furthermore, the polymer was soluble in solvents for both segments such as toluene, tetrahydrofuran and chloroform.

EXAMPLE 10

Compatible blends of a polymer of the invention with thermoplastic polymers.

The polymer of sample F of Example 4 was dissolved in tetrahydrofuran to form a 6 percent by weight solution. Separate portions of the solution were added to solutions (10 percent by weight in tetrahydrofuran) of various thermoplastic resins. The resulting solutions were clear. The solutions were poured into separate petri dishes and allowed to air dry for sixteen hours. The dried samples were then placed in a forced air oven at 100° C. to drive off any residual solvent. The resulting samples were clear and flexible. The glass transition temperature of the samples was measured by differential thermal analysis. The results of the transition temperature determinations are listed below:

| Polymers | Weight Ratio | $T_g$(°C.) |
| --- | --- | --- |
| Polymethylmethacrylate (PMMA) | 100 | 102 |
| Polyvinylchloride (PVC) | 100 | 81 |
| Poly-2,5-oxolanylene (POX) | 100 | 25 |
| PMMA/POX | 50/50 | 55 |
| PVC/POX | 50/50 | 52 |
| PMMA/POX | 75/25 | 65 |
| PVC/POX | 75/25 | 72 |

In all cases only a single glass transition temperature was noted. The film clarity, flexibility and glass transition temperature data (i.e. a single $T_g$ which is intermediate between the parent polymers) are convincing evidence of compatible polymer blends.

EXAMPLE 11

Compatible blends of a polymer of the invention with epoxy resins.

Polymer I of Example 4 was used to form compatible mixtures with various epoxy resins. The mixtures were applied to a vinyl surface and cured to form coatings. The following formulations were prepared and applied:

| Lot | Polymer I (grams) | Epoxy Resin (grams) | Photoactivator(3) (grams) | Solvent(4) (grams) |
| --- | --- | --- | --- | --- |
| A | 0.05 | 0.45(1) | 0.025 | 5 |
| B | 0.1 | 0.4(1) | 0.025 | 5 |
| C | 0.2 | 0.3(1) | 0.025 | 5 |
| D | 0.3 | 0.2(1) | 0.025 | 5 |
| E | 0.4 | 0.1(1) | 0.025 | 5 |
| F | 0.1 | 0.4(2) | 0.025 | 5 |

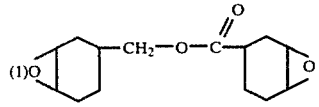

Epoxy equivalent weight (EEW) 133.

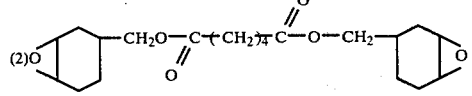

Epoxy equivalent weight 213.
(3)Four parts diphenyliodonium hexafluorophosphate and one part 2-chlorothioxanthene.
(4)Tetrahydrofuran.

After coating, the solutions were allowed to air dry 16 hours and then 10 minutes in a 100° C. forced air oven. At this point the coatings were clear and tacky. The coatings were then photocured by placing them 10 centimeters away from a sunlamp (250 W.—General Electric) for five minutes. The cured coatings remained clear and demonstrated increased flexibility, adhesion and solvent resistance (resistance to methyl ethyl ketone) when compared to control coatings containing no poly-2,5-oxolanylene.

EXAMPLE 12

Compatible blend of a polymer of the invention with a thermosetting polyester resin.

Polymer F of Example 4 was added to a free radically curable thermosetting polyester resin. The following mixture was prepared:

| | |
| --- | --- |
| Polymer F | 10 grams |
| Styrenated polyester resin* | 1 gram |
| Benzoin ethylether | 0.01 gram |

*Polyester of 1 mole isophthalic acid, 1 mole maleic acid and 2.2 moles propylene glycol. The resin is 1 part styrene to 2 parts polyester.

The clear solution was cast onto a polyethylene terephthalate film, and the solvent was driven off by drying in a 100° C. oven for 10 minutes. The resulting clear and tacky film was exposed to a 250 W. sunlamp at a distance of 10 centimeters for ten minutes. The resulting film was a perfectly clear, leathery material having excellent adhesion to the polyester film. When the polyester resin alone was cured with benzoin ethyl ether, a brittle, glassy film was obtained which had poor adhesion to the polyester film.

What is claimed is:

1. As an article of manufacture, a normally hydrophobic substrate which has been rendered hydrophilic by application thereto of a coating of a water-insoluble polymer containing recurring 2,5-oxolanylene units of the formula:

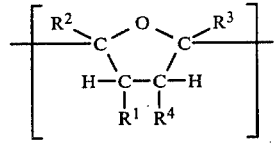

wherein at least 60 percent of said units are joined directly to one another so as to provide segments consisting of at least six of said units; and wherein $R^1$, $R^2$, $R^3$ and $R^4$ are, individually, hydrogen or alkyl groups containing up to 8 carbon atoms each.

2. An article of manufacture in accordance with claim 1 wherein said hydrophobic substrate comprises a polyester.

* * * * *